June 18, 1946.  T. H. WHALEY, JR  2,402,355
DISPENSING SYSTEM
Filed June 26, 1941  4 Sheets-Sheet 2
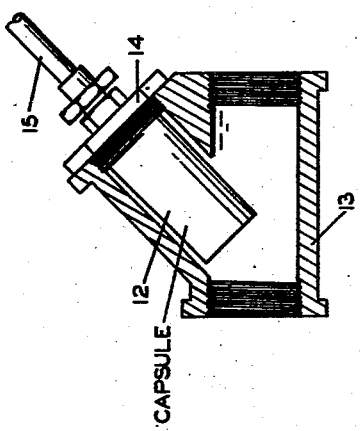
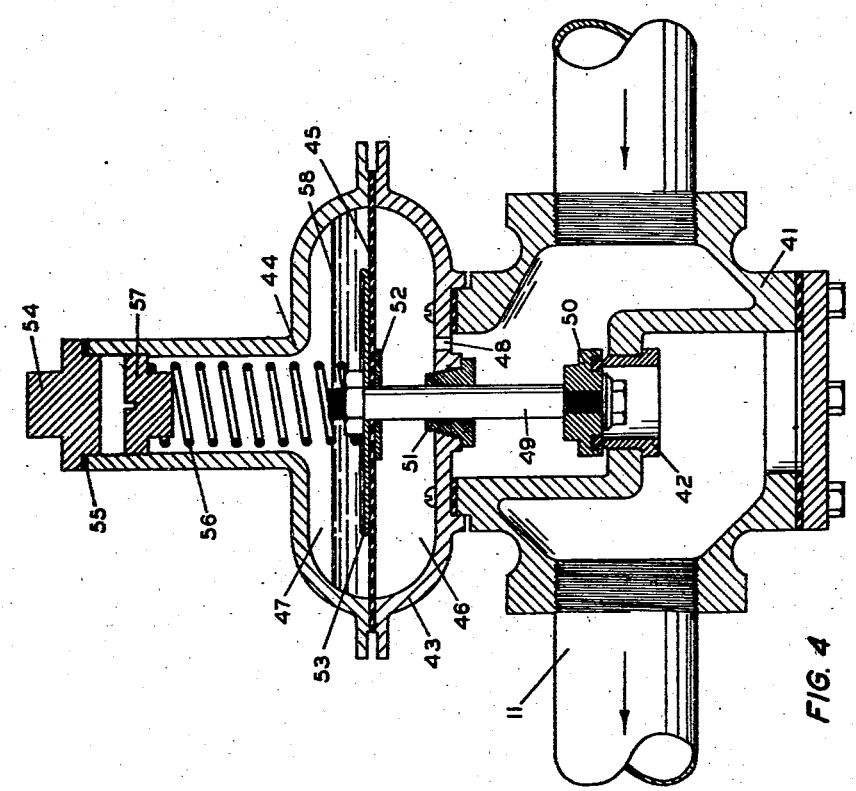
INVENTOR
T. H. WHALEY JR.
BY
ATTORNEY June 18, 1946.     T. H. WHALEY, JR     2,402,355
DISPENSING SYSTEM
Filed June 26, 1941     4 Sheets-Sheet 3

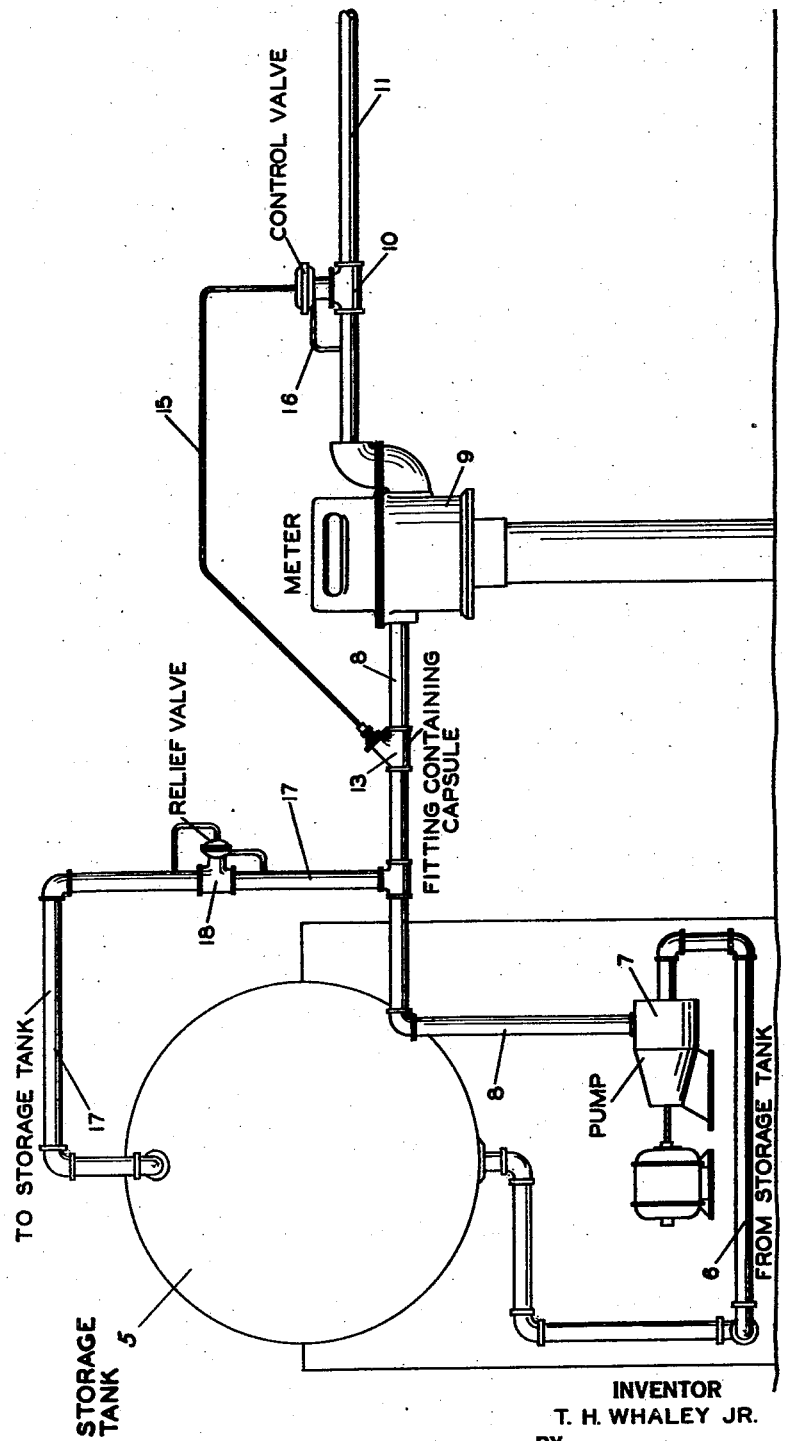

INVENTOR
T. H. WHALEY JR.
BY
ATTORNEY

Patented June 18, 1946

2,402,355

UNITED STATES PATENT OFFICE 2,402,355

DISPENSING SYSTEM

Thomas H. Whaley, Jr., Bartlesville, Okla., assignor to Phillips Petroleum Company, a corporation of Delaware Application June 26, 1941, Serial No. 399,924

16 Claims. (Cl. 62—1)

This invention relates to a method of and apparatus for dispensing volatile liquids. It is particularly adapted to the dispensing and metering of highly volatile or liquefied petroleum gases.

Liquefied gases and volatile liquids, such as propane, butane, and mixtures thereof or including one or both are being marketed extensively for use as motor and domestic fuels. The volatile liquids are stored either above-ground or underground in suitable storage tanks from which they are transferred to fuel tanks or containers. In metering and dispensing volatile liquids and liquefied gases in the liquid state, considerable difficulty is sometimes experienced in determining the true volume of liquid dispensed. The piping and dispensing equipment are often subjected to atmospheric temperature conditions and may attain temperatures higher than that prevailing in the storage tank. The liquid being dispensed tends to partially vaporize when subjected to the increased temperature and the volume of fluid dispensed is thereby increased.

The use of displacement meters for measuring the volume of the liquid dispensed requires that certain precautions be observed to prevent the increase in volume due to vaporization in the meters or conduits leading to the meters. The presence of vapors in the liquid results in false meter indications, the meter indicating a volume greater than the actual volume of liquid passing therethrough. Liquid meters, for example, meters of the positive displacement type, may be used successfully for metering volatile liquids and liquefied gases if the pressure at which the liquid is metered exceeds the vapor pressure corresponding to the temperature at which the liquid is metered.

The meters may be used with a pump and pressure regulator. Liquid to be dispensed is taken from the storage tank by the pump and passed to the meter at increased pressure. A constant pressure in excess of the vapor pressure of the liquid is maintained at the discharge of the meter. For accuracy of measurement under all conditions, the pressure maintained on the meter must exceed the maximum vapor pressure which may exist in the meter. Such a system requires that the pump and meter be operated at a pressure much higher than that required for normal operating temperatures and consequently, much power is wasted in pumping. The system disclosed by Francis W. Wilcox in U. S. Patent No. 2,049,239, is an improvement over the system just described in that the vapor pressure of the liquid in the storage tatnk determines the metering pressure and the pressure maintained on the meter exceeds the pressure in the storage tank by a constant amount during pumping. The storage tank may not always be subject to the same temperature conditions as the meter and the conduits between the storage tank and the meter. This is particularly true if the storage tank is underground and the meter and piping are exposed to atmospheric temperatures. In accordance with the present invention, the metering pressure is determined by the vapor pressure of volatile liquid or liquefied gas subjected to the temperature conditions existing at the meter.

An object of this invention is to provide an improved system for dispensing and metering volatile liquids.

Another object of this invention is to provide apparatus for use in a system for dispensing liquids.

Still another object of this invention is to provide a method and apparatus for accurately metering volatile liquids and liquefied gases under variable temperature conditions.

Other objects and advantages of this invention will be apparent from the detailed description and accompanying drawings.

Figure 1 is an elevational view of a system for dispensing volatile liquids in accordance with the present invention.

Figures 2 and 3 are cross-sections of apparatus suitable for use with the system of Figure 1.

Figure 4 is a cross-section of an improved control valve for use in dispensing equipment.

Figure 3:
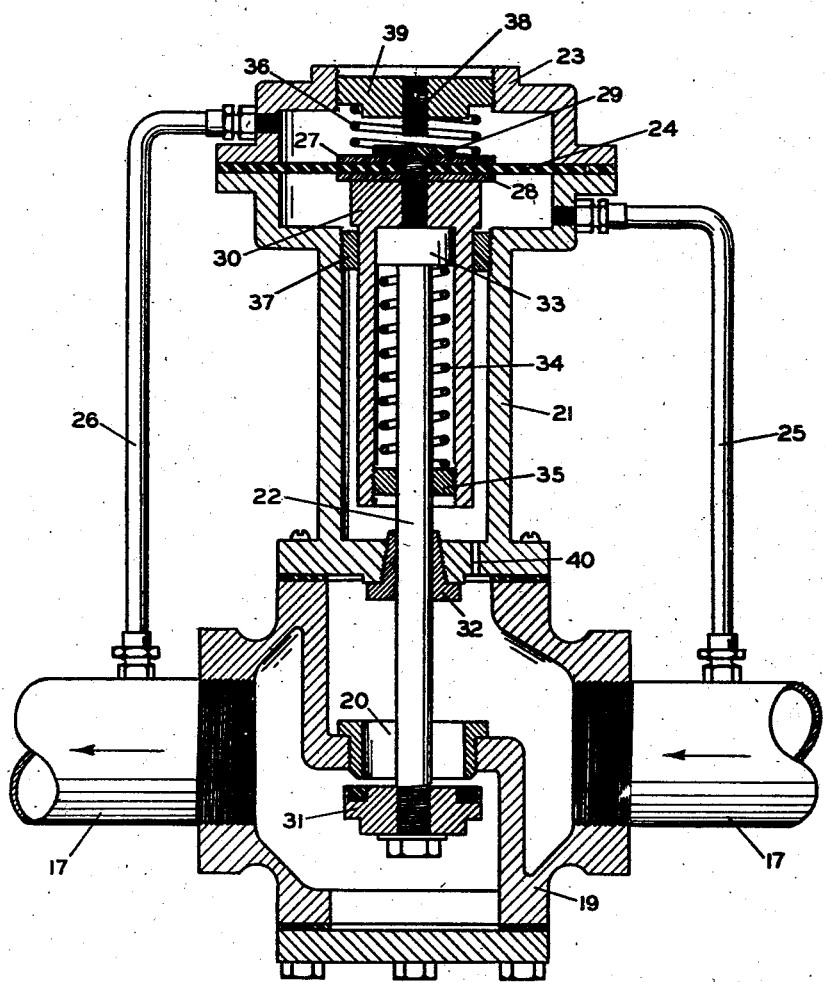

With reference to Figure 1 of the drawings, the numeral 6 designates a pipe through which liquid from storage tank 5 may be admitted to the pump 7. The pump 7 discharges the liquid at increased pressure through the pipe 8 to the meter 9. From the meter 9 the liquid passes through the control valve 10, governed in accordance with the present invention, and is dispensed through the conduit 11 to a container or apparatus for utilization of the liquid. The control valve 10 preferably comprises a pressure differential operated motor valve of the diaphragm or similar type. Such valves are well known in the art and may be constructed and adjusted to open or close when the desired differential between two pressures is attained. The control valve 10 controls the pressure at which the meter is operated maintaining the meter pressure higher than the vapor pressure of the liquid being metered by an amount sufficient to insure the absence of vapor in the meter.

The pressure at which metering is carried out is determined by the vapor pressure of a quantity of liquid having vapor pressure characteristics the same as or similar to the liquid dispensed and subjected to the same temperature conditions as the meter. This liquid will be referred to herein as the control liquid. The control liquid is contained in a capsule 12 which may be at the meter inlet, at the outlet, or built into the meter itself. With reference to Figure 2, the capsule 12 is shown in a Y pipe fitting 13 associated with the pipe 8 of Figure 1. The capsule is attached to a reducing coupling 14 which facilitates removal or replacement of the capsule. The capsule is in communication with the control valve 10 through the pipe 15. The meter discharge pressure is communicated to the control valve 10 by the pipe 16.

The control liquid contained in the capsule may be the same as the liquid dispensed. In this instance the control liquid may be a sample of the liquid being dispensed and the vapor pressure of the control liquid is equal to the vapor pressure of the liquid being metered. The control valve used with this control liquid is one which requires a differential between the meter pressure and the vapor pressure exerted by the control liquid before the valve opens to allow liquid to flow through the conduit 11. The differential in pressure is sufficient to prevent vapors of the liquid from existing at the metering temperature. A differential in pressures on the order of 5–10 pounds per square inch, for example, is sufficient. This is obtained in most conventional diaphragm type control valves by the action of a spring on the lower pressure side of the diaphragm; as an alternative, a pressure ratio regulator similar to that shown in the patent to Rosswell W. Thomas, 1,977,925, has been found suitable for use as the control valve. The pressure ratio regulator maintains a substantially constant ratio of metering pressure to the vapor pressure of the control liquid during the operation of the pump and meter. A ratio of metering pressure to vapor pressure of the control liquid greater than unity is required to prevent vaporization in the meter if the control liquid is of the same composition or has the same vapor pressure characteristics as the liquid being dispensed.

The control liquid contained in the capsule may be more volatile than the liquid dispensed. Such a liquid exerts a vapor pressure greater than the vapor pressure of the liquid being dispensed. For example, if the liquid being dispensed is a mixture of 25% propane and 75% n. butane, then the control liquid used might be 30% propane and 70% n. butane. The vapor pressure of the latter mixture is 3 pounds per square inch higher than that of the former at 40° F. and 10 pounds per square inch higher at 110° F. Such a control liquid obviates the necessity of using a spring loaded diaphragm in the control valve. With a single diaphragm motor, the metering pressure must equal or exceed the vapor pressure of the control liquid before the valve opens and this pressure, being greater than the vapor pressure of the liquid dispensed, assures accurate meter indications.

Fluid passing the pump 7 may be returned to storage through the pipe 17 which intersects the pipe 8 between the pump and the meter. A regulator valve 18 interposed in the pipe 17 acts as a relief valve for the pump when no liquid is being metered through the meter 9. The regulator valve 18 opens to allow fluid from the discharge of the pump to pass through the pipe 17 when the pressure in the pipe 8 becomes excessive. Several types of valves are available for use as the regulator 18. These include differential-pressure regulators, back-pressure regulators, and relief or safety valves. A specific form of the regulator valve 18 forming a part of the present invention is shown in cross-section in Figure 3.

With reference to Figure 3 the regulator valve 18 comprises a valve body member 19 having a valve seat insert 20 therein. Attached to the valve body member, the bonnet 21 houses the valve stem 22, and cooperates with the cover 23 to secure the diaphragm 24. Pressure from the upstream side of the valve is transmitted to the lower side of the diaphragm by the conduit 25. The upper side of the diaphragm, or the compartment contained between the cover 23 and the diaphragm, is in communication with the downstream side of the valve through the conduit 26. The backing plates 27 and 28 are securely clamped to the diaphragm by the bolt 29 which extends through the diaphragm and backing plates and is screw threaded into the cylinder 30. The valve stem 22, to which the valve disk 31 is attached, extends through the guide 32 and into the cylinder 30, terminating in the piston 33. A compression spring 34, held in position in the cylinder by the screw threaded bushing 35, presses against the piston 33. The spring 36 above the diaphragm pushes downward on the diaphragm and, in turn, on the valve stem 22 tending to open the valve by moving the valve disk 31 off the valve seat 20. The downward movement of the cylinder 30 and diaphragm backing plates is limited by the screw threaded ring 37. The upward movement of the cylinder and diaphragm is limited by the adjusting screw 38. The compression of the spring 36 may be adjusted by the screw threaded plug 39 in the cover 23. The compression of the spring 34 may be adjusted by the screw threaded bushing 35 in the cylinder.

The regulator valve structure of Figure 3 serves not only as a relief valve to prevent excessive pressures in the pipe 8, but serves also to eliminate vapors and incondensible gases from the pipe 8, especially during pump starting periods when the pump discharge pressure is less than the pressure required to open the control valve 10. During periods in which the pump is idle, vaporization may occur in the pump and associated piping. When pumping is resumed, these vapors must be purged to allow the pump to fill with liquid. Many pumps will develop very little discharge pressure when filled with vapors. The vapors must be eliminated from the pump and piping before the pump will develop a pressure head sufficient to effect transfer of the liquid. Economic loss and fire hazards result if the vapors are allowed to escape to the atmosphere. The regulator of Figure 3 automatically releases fluid from pipe 8 to storage through pipe 17 during those periods in which the head developed by the pump is below a predetermined minimum.

When the pump is developing no pressure head, the regulator assumes the position shown in Figure 3 with the valve disk unseated. The amount by which the valve is opened during idle periods is governed by the ring 37 or by adjustment of the valve disk 31 on the valve stem. When the pump is started, vapors pass through the open valve and through the pipe 17 to storage. During the priming period the pump develops very little pressure head and the valve is maintained open by the action of spring 36. When the pump is primed and the discharge piping filled with liquid, the liquid begins to flow through the regulator. The opening between the valve disk and valve seat is insufficient to allow passage of the liquid at the capacity of the primed and properly operating pump with the result that the pressure rapidly increases in the pump discharge pipe 8. The pressure in the discharge pipe is transmitted to the lower or bonnet side of the diaphragm through the conduit 25 and passage 40. When the pressure in the pump discharge piping exceeds that in the section of piping leading from valve 18 to the storage tank by an amount sufficient to cause compression of the spring 36, the valve closes. The diaphragm 24 moves upward against the action of the spring 36 moving the cylinder 30 and valve stem 22 to a position in which the valve disk 31 coacts with the valve seat 20 to close the valve. The upward movement of the diaphragm, cylinder, and valve stem is limited by the adjusting screw 38. If incondensible gases are contained in the liquid being dispensed, the gases may be eliminated from pipe 8 by allowing them to pass with some liquid through the regulator. This may be accomplished by adjustment of the regulating screw 38 to prevent seating of the valve disk. When excessive pressures are developed, the valve disk 31 is pushed away from the valve seat 20 against the action of the spring 34, allowing the valve to open. When the excessive pressure is relieved, the spring 34 acting against the piston 33 returns the valve disk to normal operating position.

Figure 5:
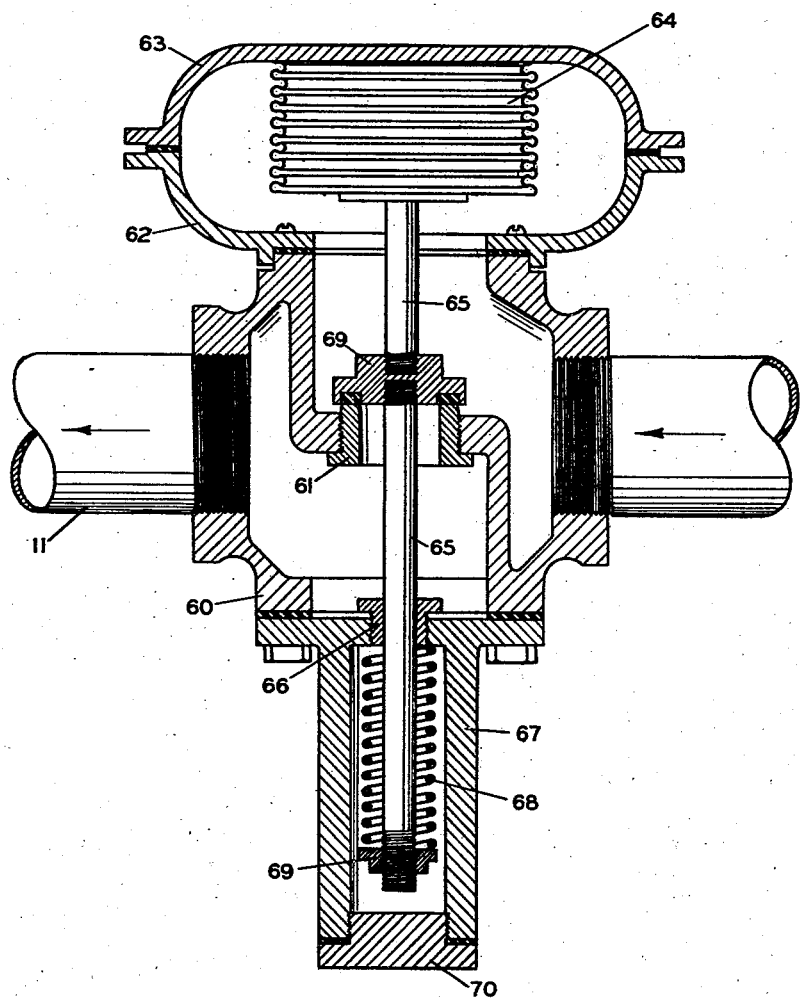
Figure 5 is a cross-section of a modification of the control valve of Figure 4.

The control valve 10 and capsule 12 of Figures 1 and 2 may be replaced by either of the control valves shown in Figures 4 and 5, forming a part of this invention. With reference to Figure 4 of the drawings, the numeral 41 designates the valve body of the control valve containing a valve seat 42. Mounted on the valve body is a motor housing comprising the base 43 and the top 44. The housing is divided by the diaphragm 45 which acts as the motor for operating the valve. The base 43 defines a fluid compartment 46 below the diaphragm while the top 44 defines a control compartment 47 above the diaphragm. The fluid compartment 46 is in communication with the interior of the valve body through the opening 48. The valve stem 49 is attached to the valve disk 50 and passes through the guide 51. The diaphragm is secured to the valve stem by the clamping action of the backing plates 52 and 53. The top 44 of the motor housing is closed by the plug 54 and sealed by the gasket 55. The control compartment may be provided with the spring 56 and adjusting screw 57. The control liquid contained in the capsule of Figure 2 is designated by the numeral 58 and is contained in the control compartment 47 of the regulator.

In operation, the control valve of Figure 4 is placed near the meter outlet between the meter and conduit 11. The control valve is thereby subjected to the same atmospheric temperature conditions as the meter. The vapor pressure of the control liquid is exerted on the top of the diaphragm tending to seat the valve disk 50 and close the valve. The auxiliary spring 56, which is optional, augments the vapor pressure of the control liquid in closing the valve. Before the control valve opens to allow metered liquid to be dispensed through the conduit 11, the pressure in the fluid compartment must be sufficient to force the diaphragm 45 upward against the action of the vapor pressure of the control liquid and the spring 56, if used. The pressure drop across the valve disk 50 tends also to maintain the valve in closed position. When the pressure at the discharge side of the meter, transmitted to the fluid compartment through the opening 48, is sufficient to overcome the opposing forces, the valve stem and disk are raised by the diaphragm allowing the liquid to flow through the control valve to the conduit 11. When the pressure in the meter drops below that determined by the vapor pressure of the control liquid, the valve closes. Heat exchange between the metered liquid and the control liquid in the control valve insures control at the metering temperature. The control valve of Figure 4 makes unnecessary the use of a capsule and pipe of Figures 1 and 2.

With reference to Figure 5, the valve body 60 is provided with a valve seat 61. Attached to the valve body is a motor housing comprising the base 62 and cover 63. Attached to the cover 63 is a Sylphon bellows 64 containing control liquid and vapor from the control liquid. The valve stem 65 is connected to the Sylphon bellows and extends through the valve body and the guide 66 into the spring compartment of the spring housing 67. The spring 68, which is optional, is held in place and slightly compressed by the adjusting nut 69. The spring supplements the vapor pressure of the control liquid to force the valve disk 69 into closed position. The spring housing is closed at its lower end by the plug 70.

The operation of the control valve of Figure 5 is the same as that of Figure 4. The control valve remains in the closed position until the pressure on the upstream side of the valve is sufficient to compress the Sylphon bellows against the vapor pressure of the control liquid contained therein and the supplementary action of the spring, if used. In either Figure 4 or Figure 5 the spring may be omitted if a control liquid more volatile than that of the dispensed liquid is used, or if the pressure drop across the valve disk is sufficient to supplement the vapor pressure of the control liquid to the desired extent. Liquid from the meter, entering the control valve has access to the motor housing and comes into contact with the Sylphon bellows. This effects a heat transfer between the metered liquid and the control liquid insuring identical temperature conditions.

Various changes may be made in the structures described herein without departing from the spirit of the invention. It is to be understood that the back-pressures or meter pressures maintained by the control valves in this invention are determined by the vapor pressure of a control liquid having vapor pressure characteristics similar to or identical with the liquid being controlled and subjected to the same temperature conditions. The effect of auxiliary forces is to increase or decrease the controlled pressure over that corresponding to the vapor pressure of the control liquid.

I claim:

1. The method of dispensing metered quantities of a volatile liquid under variable temperature conditions to prevent vaporization of the liquid during the metering thereof comprising passing the liquid under pressure through a meter, and maintaining the pressure in the meter in accordance with the vapor pressure of a volatile control liquid in heat exchange relation with the liquid metered.

2. In a system for dispensing metered quantities of a volatile liquid, the combination comprising a pump, a liquid meter communicating with the discharge of said pump, a container subjected to substantially the temperature of the meter and containing a volatile control liquid, and means responsive to the vapor pressure of the control liquid for determining the minimum pressure of said volatile liquid in the meter during the metering thereof and for permitting flow of liquid through the meter only when the pressure in the meter is at least equal to said minimum pressure.

3. In a system for dispensing metered quantities of a volatile liquid under variable temperature conditions, the combination comprising a pump, a liquid meter communicating with the discharge of said pump, a container in heat exchange relation with the liquid in the immediate vicinity of the meter, said container containing a volatile control liquid, and a control valve responsive to the vapor pressure of the control liquid for determining the minimum pressure in the meter during the metering of said liquid, said valve permitting flow of liquid through the meter only when the pressure in the meter is at least equal to said minimum pressure.

4. In a system for dispensing volatile liquids, the combination comprising a pump, a liquid meter in the discharge of said pump, a container in the immediate vicinity of the meter containing a volatile control liquid in heat exchange with the liquid being dispensed, and a control valve responsive to the difference between the pressure in the meter and the vapor pressure of the control liquid to permit flow of liquid through the meter only when the meter pressure exceeds the vapor pressure of the control liquid.

5. In a system for dispensing volatile liquids, the combination comprising a pump; a liquid meter communicating with the discharge of said pump; a control valve in the discharge of the meter for cutting off flow through the meter when the pressure in the meter is less than a predetermined metering pressure; a differential pressure actuated means for operating the control valve and containing a volatile control liquid, the vapor pressure of which determines said predetermined metering pressure; and means for subjecting the pressure actuated means to the meter pressure in opposition to the vapor pressure of the control liquid to maintain the valve open when the meter pressure is in excess of the predetermined pressure.

6. A regulator valve for use in a pumping system comprising a valve body having an inlet and outlet; a valve seat in the valve body; a valve disk cooperating with the valve seat in valve closing position, any pressure at the valve inlet in excess of that at the valve outlet tending to urge the valve disk away from the valve seat into valve opening position; a pressure responsive element; a resilient connecting means between the valve disk and the pressure responsive element; means for transmitting the inlet and outlet pressures to opposite sides of the pressure responsive element, the pressure responsive element tending to urge the valve disk into closed position in response to pressure at the valve inlet in excess of that at the valve outlet; and resilient means opposing the action of such excess pressure to urge the valve disk into valve opening position.

7. The method of dispensing metered quantities of a volatile liquid which comprises passing the liquid from a source of supply through a metering zone subject to variations in temperature, maintaining a volatile control liquid at the temperature of the metering zone, said control liquid having substantially the same vapor pressure characteristics as the liquid dispensed, balancing the pressure in the metering zone against the vapor pressure of the control liquid, and so controlling the discharge from the metering zone in accordance with the vapor pressure of the control liquid as to allow passage of liquid through the metering zone only when the pressure in the metering zone is in excess of the vapor pressure of the liquid being metered.

8. The method of dispensing metered quantities of a volatile liquid under variable temperature conditions which comprises passing the liquid to be dispensed through a metering zone, maintaining a volatile control liquid in heat exchange relation with the liquid dispensed in the immediate vicinity of the meter, said control liquid having substantially the same vapor pressure within the range of temperature variations as has the liquid dispensed, balancing the pressure in the metering zone against the vapor pressure of the control liquid, and so controlling the discharge from the metering zone in accordance with the vapor pressure of the control liquid as to allow passage of liquid through the metering zone only when the pressure in the metering zone is in excess of the vapor pressure of the liquid being metered.

9. The method of dispensing metered quantities of a volatile liquid under variable temperature conditions which comprises passing the liquid to be dispensed through a metering zone, maintaining a volatile control liquid in heat exchange relation with the liquid dispensed in the immediate vicinity of the meter, the control liquid being more volatile than the liquid dispensed, opposing the pressure in the metering zone to the vapor pressure of the control liquid, and so controlling the discharge from the metering zone in accordance with the vapor pressure of the control liquid as to allow passage of liquid through the metering zone only when the pressure in the metering zone is in excess of the vapor pressure of the control liquid.

10. A control valve for use with volatile liquids comprising a valve body having an inlet and outlet, a valve in the valve body, a diaphragm motor operably connected to said valve, a control compartment adjacent the diaphragm containing a volatile control liquid having substantially the same vapor pressure characteristics as the volatile liquid controlled by the valve, a fluid compartment opposed to the control compartment, and means for transmitting fluid pressure and temperature at the inlet of the valve body to the fluid compartment, said fluid pressure acting on the diaphragm motor in opposition to the vapor pressure of the volatile control liquid in the control compartment.

11. A regulator comprising a body member having a fluid inlet and a fluid outlet; a valve in said body member for controlling the flow of fluid between the inlet and outlet thereof, and means forming part of said regulator and responsive to the differential between the fluid pressure in said inlet and outlet to open the valve when the pressure differential is less than a first predetermined value and close the valve when the differential rises above said value, said means including means urging the valve toward its seat and yieldable to permit the valve to be opened by a rise in the pressure differential above a second predetermined value.

12. A regulator comprising a body member having a fluid inlet and a fluid outlet; a valve in said body member for controlling the flow of fluid between the inlet and outlet thereof; a chamber in said body member; a movable partition across said chamber, said partition moving in one direction in response to a predetermined pressure difference between the pressure upstream of said inlet and the pressure downstream of said outlet; and means for closing the valve upon predetermined movement of the partition in said direction, said valve moving into open position against the action of said last named means when the pressure difference between the pressure upstream of said inlet and the pressure downstream of said outlet reaches a predetermined value higher than that of said first mentioned predetermined pressure difference.

13. In a system of the character described, the combination comprising a storage tank, a pump, means for supplying liquid from the storage tank to the pump, a meter, a discharge conduit from the pump to the meter, a second conduit arranged to receive liquid discharged from the pump and conduct it to the storage tank, a regulator including a valve in said second conduit, and means forming part of said regulator and responsive to the differential between the pump discharge pressure and the pressure in the storage tank to open the regulator valve when the pressure differential is less than a first predetermined value and close the valve when the differential rises above said value, said second mentioned means including means urging the valve toward its seat and yieldable to permit the valve to be opened by a rise in the pressure differential above a second predetermined value.

14. In a system for dispensing volatile liquids by pumping through a discharge conduit, the improvement comprising a second conduit arranged to receive the discharge from the pump and conduct it to the liquid container of the system, a regulator including a valve in said second conduit, and means forming part of said regulator and responsive to the differential between the pump discharge pressure and the pressure in the liquid container to open the regulator valve when the pressure differential is less than a first predetermined value and close the valve when the differential rises above said value, said means including means urging the valve toward its seat and yieldable to permit the valve to be opened by a rise in the pressure differential above a second predetermined value.

15. In a system of the character described, the combination comprising a storage tank, a pump, means for supplying liquid from the storage tank to the pump, a meter, a discharge conduit from the pump to the meter, a second conduit arranged to receive liquid discharged from the pump and conduct it to the storage tank, a regulator including a valve in said second conduit and means forming part of said regulator and responsive to the differential between the pump discharge pressure and the pressure in the storage tank to open the valve when the pressure differential is less than a first predetermined value and close the valve when the differential rises above said value, the second mentioned means including means urging the valve toward its seat and yieldable to permit the valve to be opened by a rise in the pressure differential above a second predetermined value, and means responsive to the vapor pressure of a control liquid subjected to the meter temperature for determining the minimum pressure maintained on the meter during normal operation of the dispensing system and for permitting flow of liquid through the meter only when the pressure in the meter is at least equal to said minimum pressure.

16. In a system of the character described, the combination comprising a storage tank, a pump, means for supplying liquid from the storage tank to the pump, a meter, a discharge conduit from the pump to the meter, a control liquid in heat exchange with the liquid passing through the meter, a control valve responsive to the vapor pressure of the control liquid for determining the minimum pressure at which liquid passes through the meter, said valve permitting flow of liquid through the meter only when the pressure in the meter is at least equal to said minimum pressure, a second conduit arranged to receive liquid discharged from the pump and conduct it to the storage tank, a regulator including a valve in said second conduit and means forming part of said regulator and responsive to the differential between the pump discharge pressure and the pressure in the storage tank to open the valve when the pressure differential is less than a first predetermined value and close the valve when the pressure rises above said value, the second mentioned means including means for urging the valve toward its seat and yieldable to permit the valve to be opened by a rise in the pressure differential above a second predetermined value.

THOMAS H. WHALEY, Jr.